Patented Jan. 13, 1948

2,434,414

UNITED STATES PATENT OFFICE 2,434,414

PROCESS OF MAKING 2-HYDROXYMETHYL-1,4-DIOXANE

Morris S. Kharasch, Chicago, Ill., assignor to Eli Lilly and Company, Indianapolis, Ind., a corporation of Indiana No Drawing. Application October 25, 1943, Serial No. 507,615

2 Claims. (Cl. 260—338)

This invention relates to 2-hydroxymethyl-1,4-dioxane and methods of preparing 2-hydroxymethyl-1,4-dioxane.

The composition of this invention is useful as a solvent.

2-hydroxymethyl-1,4-dioxane may be represented by the following formula:

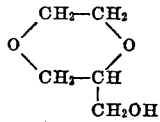

The 2-hydroxymethyl-1,4-dioxane of this invention is prepared by reacting 3-(β-hydroxyethoxy)-1,2-epoxypropane with a dehydrating agent, such as concentrated sulfuric acid. The 3-(β-hydroxyethoxy)-1,2-epoxypropane, which is a new compound, is prepared from epichlorohydrin.

The epichlorohydrin is first reacted with ethylene glycol in the presence of a dehydrating agent, such as concentrated sulfuric acid, to produce 1-chloro-3-(β-hydroxyethoxy)-2-propanol. The 1-chloro-3-(β-hydroxyethoxy)-2-propanol is reacted with an alkali metal hydroxide, such as potassium hydroxide, in a solvent which is substantially free of water, such as absolute ethyl alcohol, to produce the 3-(β-hydroxyethoxy)-1,2-epoxypropane.

A specific example of the preparation of 2-hydroxymethyl-1,3-dioxane is as follows:

To 278 g. (3 moles) of epichlorohydrin is added 379 g. (6 moles) of ethylene glycol. Since the two liquids are immiscible, the mixture is vigorously agitated, and concentrated sulfuric acid is added a few drops at a time. The mixture becomes homogeneous after the addition of 1 cc. of sulfuric acid. Since further addition of acid causes a considerable rise in temperature, the flask is cooled with running water during subsequent addition. A total of 13 cc. of sulfuric acid is added. The product is then refluxed on a steam bath for 12 hours and neutralized with excess barium carbonate (38 g.). The material is distilled directly at 3 mm. Two main fractions are obtained:

(a) Unidentified material (B. P. below 135° C.), and (b) 1-chloro-3-(β-hydroxyethoxy)-2-propanol (B. P. 135–139° C.).

Nineteen grams (0.33 mole) of potassium hydroxide pellets are added to 135 cc. of absolute alcohol in a 500 cc. round-bottom, three-necked flask fitted with a stirrer and dropping funnel. The alcoholic potassium hydroxide solution is cooled to 2° C. Then 54 g. (0.33 mole) of 1-chloro-3-(β-hydroxyethoxy)-2-propanol prepared as heretofore described and dissolved in 67 cc. of absolute ethyl alcohol is slowly added. Stirring is continued for one hour after the addition of the chloro compound. The precipitated potassium chloride is collected on a filter and washed several times with absolute ethyl alcohol; the washings are added to the main filtrate. The alcohol is removed from this filtrate by distillation at 76 mm. through a 1-foot column. The residue is distilled at 1–2 mm. and the portion of the material boiling at 90–94° C. is collected. This portion is redistilled and the fraction boiling at 92–94° C. is collected. This portion boiling at 92–94° C. at 1–2 mm. is 3-(β-hydroxyethoxy)-1,2-epoxypropane.

Thirty-nine grams of 3-(β-hydroxyethoxy)-1,2-epoxypropane is placed in a flask fitted with a reflux condenser and 1.3 cc. of concentrated sulfuric acid is added a few drops at a time. Much heat is evolved at each addition of sulfuric acid. The reaction mixture is then heated on a steam bath for 6 hours. The thick, syrupy reaction product is transferred to a Claisen flask and 4 g. of barium carbonate added. After the evolution of carbon dioxide ceases the material is distilled. Two fractions are collected:

(a) A material having a boiling point of 94–96° C. at 9 mm. and which comprises 2-hydroxymethyl-1,4-dioxane, and (b) A higher boiling material which appears to decompose when heated to 200° C. at 3–4 mm. and which is probably a linear condensation product of the epoxy compound.

Fraction (a) is redistilled and the material which boils at 92–93° C. at 8 mm. is collected. This material comprises the 2-hydroxymethyl-1,4-dioxane.

Alternately the 2-hydroxymethyl-1,4-dioxane may be prepared in accordance with the method described in Example 3 of applicant's copending application relating to 1-substituted-3-(β-hydroxyethoxy)-2-propanols, filed of even date herewith.

What is claimed is:

1. The method of producing 2-hydroxymethyl-1,4-dioxane, which comprises subjecting 3-(β-hydroxyethoxy)-1,2-epoxypropane to the action of a dehydrating agent.

2. The method of producing 2-hydroxymethyl-1,4-dioxane, which comprises subjecting 3-(β-hydroxyethoxy)-1,2-epoxypropane to the action of concentrated sulfuric acid.

MORRIS S. KHARASCH.

REFERENCES CITED

The following references are of record in the file of this patent:

UNITED STATES PATENTS

| Number | Name | Date |
|---|---|---|
| 2,072,101 | Dreyfus | Mar. 2, 1937 |

FOREIGN PATENTS

| Number | Country | Date |
|---|---|---|
| 407,035 | Great Britain | Mar. 1, 1934 |

OTHER REFERENCES

Kharasch and Nudenberg, Journal of Organic Chemistry, vol. 8, received Jan. 18, 1943, pages 189–193.